(12) United States Patent
Lin et al.

(10) Patent No.: US 10,783,840 B2
(45) Date of Patent: Sep. 22, 2020

(54) DISPLAY PANEL HAVING A TEST LINE THEREIN

(71) Applicant: HannStar Display Corporation, Taipei (TW)

(72) Inventors: Sung-Chun Lin, Tainan (TW);
Hsien-Tang Hu, Taichung (TW);
Hsuan-Chen Liu, Kaohsiung (TW);
Chien-Ting Chan, Tainan (TW)

(73) Assignee: HannStar Display Corporation, Taipei (TW)

( * ) Notice: Subject to any disclaimer, the term of this patent is extended or adjusted under 35 U.S.C. 154(b) by 42 days.

(21) Appl. No.: 16/114,231

(22) Filed: Aug. 28, 2018

(65) Prior Publication Data

US 2019/0139501 A1    May 9, 2019

(30) Foreign Application Priority Data

Nov. 9, 2017  (CN) .......................... 2017 1 1095724

(51) Int. Cl.
*G09G 3/36* (2006.01)
*G02F 1/133* (2006.01)
*G06F 3/041* (2006.01)
*G02F 1/1333* (2006.01)

(52) U.S. Cl.
CPC ....... *G09G 3/3607* (2013.01); *G02F 1/13306* (2013.01); *G02F 1/13338* (2013.01); *G06F 3/0412* (2013.01); *G09G 2310/0264* (2013.01)

(58) Field of Classification Search
CPC .............................................. G09G 2310/0264
See application file for complete search history.

(56) References Cited

U.S. PATENT DOCUMENTS

2007/0138956 A1\* 6/2007 Lee .................... G09G 3/006
313/512

\* cited by examiner

*Primary Examiner* — Gustavo Polo
(74) *Attorney, Agent, or Firm* — JCIPRNET

(57) ABSTRACT

A display panel including a first substrate, a second substrate opposite to the first substrate, and a display medium located between the first substrate and the second substrate is provided. The display panel further includes a plurality of pixel structures, a plurality of data lines and a plurality of scan lines electrically connected to the pixel structures, a first driving unit located at a peripheral area, at least one test line, and at least one first pad located at the peripheral area. Each of the data lines has a first end and a second end opposite to each other. The first driving unit is electrically connected to the first ends of the data lines. The at least one test line is electrically connected to the second ends of at least part of the data lines. The at least one test line is grounded through the at least one first pad.

9 Claims, 3 Drawing Sheets

DISPLAY PANEL HAVING A TEST LINE THEREIN

CROSS-REFERENCE TO RELATED APPLICATION

This application claims the priority benefit of China application serial no. 201711095724.9, filed on Nov. 9, 2017. The entirety of the above-mentioned patent application is hereby incorporated by reference herein and made a part of this specification.

BACKGROUND OF THE INVENTION

1. Field of the Invention

The invention relates to a display panel.

2. Description of Related Art

Generally, processing of a display panel is roughly divided into an array segment, a cell segment, and a module segment. In the array segment, components such as pixel structures are manufactured on a first substrate, so as to form a pixel array substrate. In the cell segment, the pixel array substrate, a display medium, and a second substrate are assembled to form a panel. In the module segment, components of the module segment such as driving chips are bonded onto the pixel array substrate, and that the display panel is completed. Generally, a cell test is required to be performed to the panel before entering into the module segment, such that component waste may be reduced in the module segment. Only panels which pass the cell test and are equipped with high quality may enter the module segment and are manufactured to be the display panels.

Test circuits electrically connected to the pixel structures are disposed on the pixel array substrate in order to test the panels. The test circuits include test switches, pads, and test lines electrically connected to the test switches and the pads. In existing technologies, the test switches are disposed at predetermined positions of the driving chips most of the time, meaning that the test switches are located below the driving chips after the display panels are completed. Nevertheless, as resolution increases, the test switches may not be disposed owing to insufficient areas provided below the driving chips. In addition, the test lines provide no particular functions after the panels are completed, layout areas of peripheral areas are thus wasted.

SUMMARY OF THE INVENTION

The invention provides a display panel in which an electrostatic protection effect is provided by test lines of the display panel.

According to an embodiment of the invention, a display panel includes a first substrate, a plurality of pixel structures, a plurality of data lines and a plurality of scan lines, a first driving unit, at least one test line, at least one first pad, a second substrate, and a display medium. The first substrate has an active area and a peripheral area outside the active area. The pixel structures are located at the active area. The data lines and the scan lines are located at the active area and are electrically connected to the pixel structures. The data lines and the scan lines intersect each other. Each of the data lines has a first end and a second end opposite to each other. The first driving unit is located at the peripheral area and is electrically connected to the first ends of the data lines. The at least one test line is located at the peripheral area and is electrically connected to the second ends of at least part of the data lines. The at least one first pad is located on the first substrate and is electrically connected to the at least one test line. The at least one test line is grounded through the at least one first pad. The second substrate is opposite to the first substrate. The display medium is located between the first substrate and the second substrate.

To sum up, the display panel provided by the embodiments of the invention includes the at least one test line electrically connected to the data lines. The at least one test line is grounded through the at least one first pad. The grounded at least one test line provides the electrostatic protection function, and thus the components (e.g., the pixel structures etc.) of the display panel are less likely to be damaged by static electricity.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
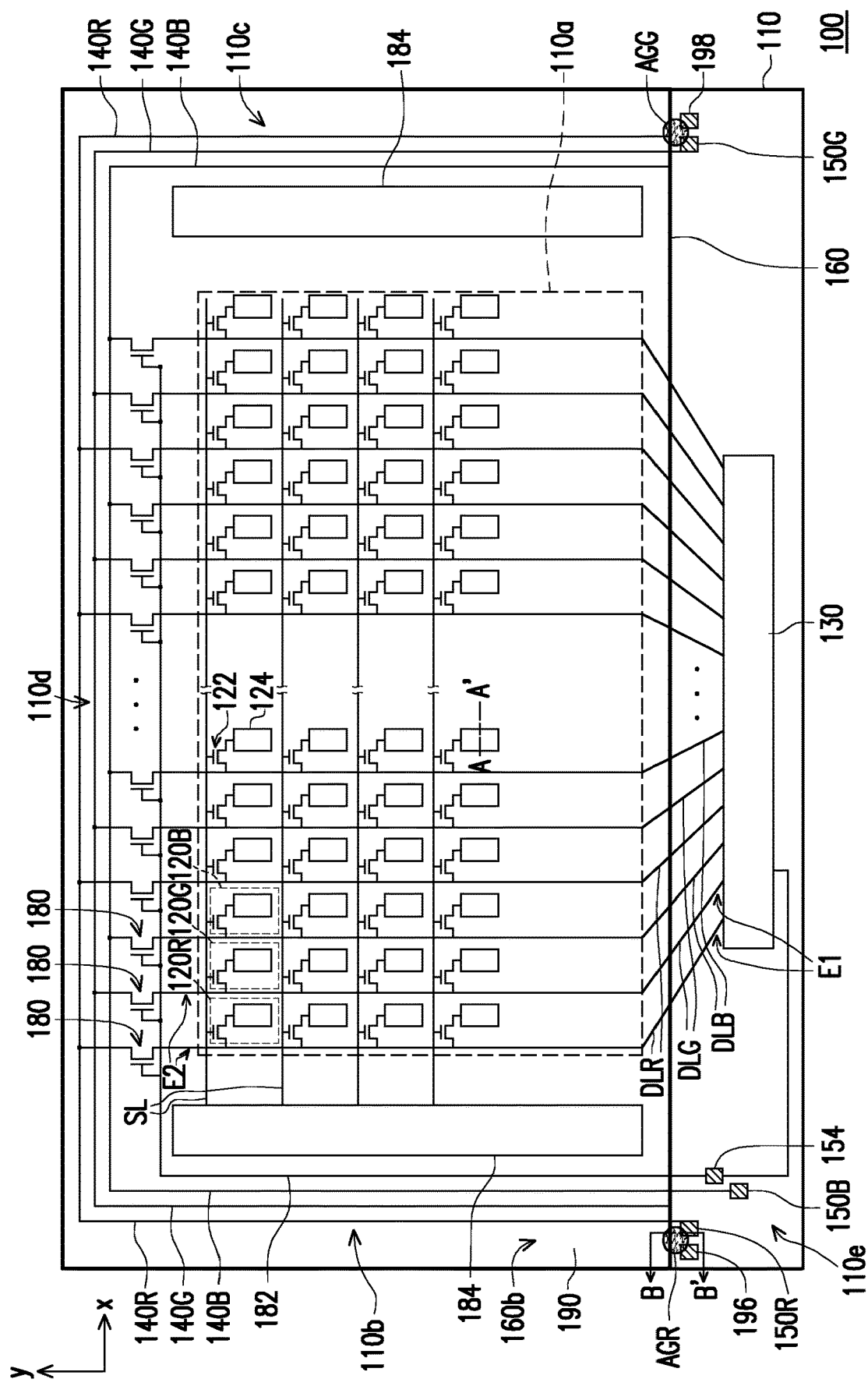
FIG. 1 is a schematic top view of a display panel according to an embodiment of the invention.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
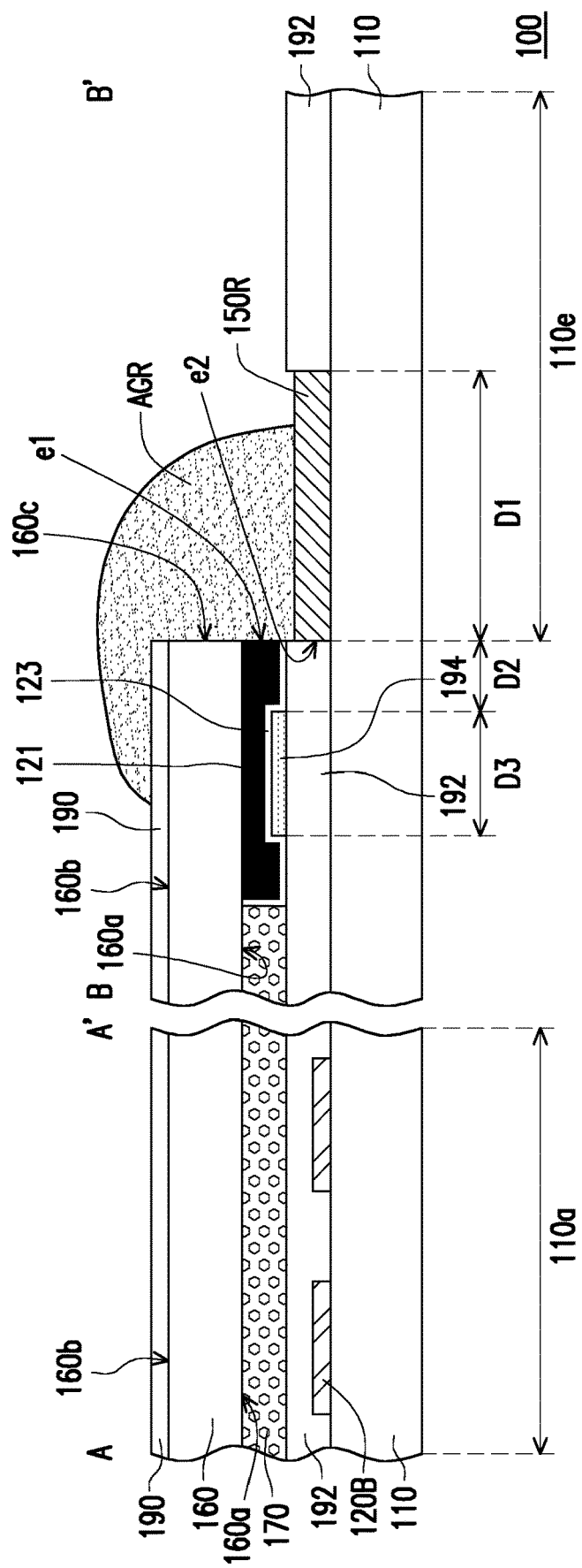
FIG. 2 is a schematic cross-sectional view of a display panel according to an embodiment of the invention.

FIG. 1 is a schematic top view of a display panel according to an embodiment of the invention. FIG. 2 is a schematic cross-sectional view of a display panel according to an embodiment of the invention. To be specific, FIG. 2 corresponds to a sectional line A-A' and a sectional line B-B' in FIG. 1. With reference to FIG. 1 and FIG. 2, a display panel 100 includes a first substrate 110, a plurality of pixel structures 120R, 120G, and 120B, a plurality of data lines DLR, DLG, and DLB, a plurality of scan lines SL, a first driving unit 130, test lines 140R, 140G, and 140B, first pads 150R, 150G, and 150B, a second substrate 160, and a display medium 170. The pixel structures 120R, 120G, and 120B, the data lines DLR, DLG, and DLB, the scan lines SL, the first driving unit 130, the test lines 140R, 140G, and 140B, and the first pads 150R, 150G, and 150B are disposed on the first substrate 110. The second substrate 160 is opposite to the first substrate 110. The display medium 170 is located between the first substrate 110 and the second substrate 160. The display panel 100 may further include a planarization layer 192 and a sealant 194 (shown in FIG. 2) in this embodiment. The planarization layer 192 covers the pixel structures 120R, 120G, and 120B, and the sealant 194 is disposed on the planarization layer 192. The display medium 170 may be located in a space surrounded by the planarization layer 192, the second substrate 160, and the sealant 194, which should however not be construed as limitations to the invention. In this embodiment, a material of the first substrate 110 and/or the second substrate 160 is, for example, glass, quartz, organic polymer, an opaque/reflective material (e.g., wafer, ceramics, etc.), or other suitable materials. In this embodiment, the display medium 170 is, for example, liquid crystal, which should however not be construed as limitations to the invention. In other embodiments, the display medium 170 may also be an organic electroluminescent layer or other suitable materials.

With reference to FIG. 2, the display panel 100 may further selectively include a light-shielding pattern 121 in this embodiment. The light-shielding pattern 121 is disposed on the second substrate 160 and shields the sealant 194. In this embodiment, the display panel 100 is, for example, a liquid crystal display of a fringe-field switching (FFS) mode. An insulation layer 123 may cover the light-shielding pattern 121, and the insulation layer 123 is located between the light-shielding pattern 121 and the sealant 194. The sealant 194 may be in contact with the insulation layer 123. Nevertheless, the invention should not be construed as limited thereto. In other embodiments, the display panel 100 may be a liquid crystal display of other modes, such as a liquid crystal display of a twisted nematic (TN) mode. Moreover, the display panel 100 may not have to include the insulation layer 123, and the sealant 194 may be in contact with the light-shielding pattern 121 instead.

The first substrate 110 has an active area 110a and peripheral areas 110b, 110c, 110d, and 110e outside the active area 110a. The peripheral areas 110b, 110c, 110d, and 110e may surround the active area 110a in this embodiment. The peripheral areas 110b, 110c, 110d, and 110e may respectively be located at a left side, a right side, an upper side, and a lower side of the active area 110a. The peripheral area 110e may refer to an area of the substrate 110 being exposed by the second substrate 160, and the first pads 150R, 150G, and 150B, second pads 196 and 198, a third pad 154, and the first driving unit 130 may be disposed at the peripheral area 110e. The second pads 196 and 198 may be grounded through the first driving unit 130 or an external circuit board (the external circuit board is not shown), such as a printed circuit board (PCB) or a flexible printed circuit board (FPC), which should however not be construed as limitations to the invention.

The pixel structures 120R, 120G, and 120B are located at the active area 110a of the first substrate 110. In this embodiment, each of the pixel structures 120R, 120G, and 120B includes a switch device 122 and a pixel electrode 124 electrically connected to the switch device 122. The switch device 122 is, for example, a thin film transistor including a source, a gate, and a drain. The pixel electrode 124 is electrically connected to the drain of the thin film transistor. In this embodiment, the pixel structures 120R, 120G, and 120B include a first pixel structure 120R, a second pixel structure 120G, and a third pixel structure 120B. The first pixel structure 120R, the second pixel structure 120G, and the third pixel structure 120B are respectively configured to display a first color, a second color, and a third color. For instance, the first pixel structure 120R, the second pixel structure 120G, and the third pixel structure 120B are respectively configured to display red, green, and blue in this embodiment, which should however not be construed as limitations to the invention.

The data lines DLR, DLG, and DLB are located at the active area 110a. In this embodiment, the data lines DLR, DLG, and DLB may extend to the peripheral area 110d and the peripheral area 110e, which should however not be construed as limitations to the invention. The data lines DLR, DLG, and DLB are electrically connected to the pixel structures 120R, 120G, and 120B. To be specific, the data lines DLR, DLG, and DLB are electrically connected to the sources of the switch devices 122 of the pixel structures 120R, 120G, and 120B. In this embodiment, the data lines DLR, DLG, and DLB include a first data line DLR, a second data line DLG, and a third data line DLB. The first data line DLR, the second data line DLG, and the third data line DLB are electrically connected to the first pixel structure 120R, the second pixel structure 120G, and the third pixel structure 120B, respectively.

The scan lines SL are located at the active area 110a. The scan lines SL and the data lines DLR, DLG, and DLB intersect each other. In other words, the scan lines SL and the data lines DLR, DLG, DLB may extend in different directions x and y. For instance, the direction x may be perpendicular to or intersect the direction y in this embodiment, which should however not be construed as limitations to the invention. The scan lines SL are electrically connected to the pixel structures 120R, 120G, and 120B. To be specific, the scan lines SL are electrically connected to the gates of the switch devices 122 of the pixel structures 120R, 120G, and 120B in this embodiment. The display panel 100 further includes second driving units 184 disposed at the peripheral areas 110b and 110c in this embodiment. The scan lines SL may extend to the peripheral area 110b so as to be electrically connected to the second driving units 184. The second driving units 184 are, for example, gate driver circuits. To be more specifically, the second driving units 184 may be integrated gate driver-on-array (GOA) circuits in this embodiment, which should however not be construed as limitations to the invention.

Each of the data lines DLR, DLG, and DLB has a first end E1 and a second end E2 opposite to each other. The first driving unit 130 is located at the peripheral area 110e and is electrically connected to the first ends E1 of the data lines DLR, DLG, and DLB. The first driving unit 130 includes a data line driver circuit in this embodiment. The first driving unit 130 may provide driving signals to the pixel structures 120R, 120G, and 120B through the data lines DLR, DLG, and DLB, so as to enable the display panel 100 to display an image. In this embodiment, the first driving unit 130 may be an integrated circuit chip bonded onto the first substrate 110, which should however not be construed as limitations to the invention.

The test lines 140R, 140G, and 140B are located at the peripheral areas 110b, 110c, 110d, and 110e and are electrically connected to the second ends E2 of the data lines DLR, DLG, and DLB. For instance, the display panel 100 further includes a plurality of test switches 180 located at the peripheral area 110d in this embodiment. The test switches 180 and the first driving unit 130 may be located at two opposite sides of the active area 110a. The test lines 140R, 140G, and 140B may be electrically connected to the second ends E2 of the data lines DLR, DLG, and DLB through the test switches 180. The test switches 180 are electrically connected between the test lines 140R, 140G, and 140B and the second ends E2 of the data lines DLR, DLG, and DLB. In this embodiment, the test switches 180 are, for example, thin film transistors including sources, gates, and drains. The sources of the test switches 180 are electrically connected to the second ends E2 of the data lines DLR, DLG, and DLB. The drains of the test switches 180 are electrically connected to the test lines 140R, 140G, and 140B. The display panel 100 further includes a wire 182 and the third pad 154. The gates of the test switches 180 are electrically connected to the wire 182. The wire 182 is electrically connected to the third pad 154 disposed at the peripheral area 110e. The first pads 150R, 150G, and 150B are electrically connected to the test lines 140R, 140G, and 140B, respectively.

In a process of manufacturing and detecting the display panel 100, data signals used for detection may be applied to the drains of the test switches 180 through the first pads 150R, 150G, and 150B and the test lines 140R, 140G, and 140B. Gate signals used for detection may be applied to the gates of the test switches 180 through the third pad 154 and the wire 182. When the gate signals are applied to the gates of the test switches 180, the data signals used for detection may be transmitted to the data lines DLR, DLG, and DLB. Simultaneously, whether the corresponding pixels are lit up can be observed through visual observation or optical instrument to further determine whether the pixel structures 120R, 120G, 120B work normally. Generally, after being tested (e.g., when manufacturing of the display panel 100 is completed), the gates of the test switches 180 are electrically connected to a negative direct current voltage source VGG, such that the test switches 180 are disabled or in an Off state, the data lines DLR, DLG, and DLB are prevented from being electrically connected to one another, and an abnormal display image is thus prevented. For instance, in this embodiment, the first driving unit 130 further includes a negative direct current voltage source, and the gates of the test switches 180 may be electrically connected to the negative direct current voltage source of the first driving unit 130 through the wire 182 and the third pad 154. Nevertheless, the invention should not be construed as limited thereto.

The first pads 150R, 150G, and 150B are located on the first substrate 110 and are electrically connected to the test lines 140R, 140G, and 140B. In this embodiment, the test lines 140R, 140G, and 140B include a first test line 140R, a second test line 140G, and a third test line 140B electrically connected to the second end E2 of the first data line DLR, the second end E2 of the second data line DLG, and the second end E2 of the third data line DLB, respectively. The first pads 150R, 150G, and 150B include the first pad 150R, the first pad 150G, and the first pad 150B electrically connected to the first test line 140R, the second test line 140G, and the third test line 140B, respectively. In this embodiment, the second substrate 160 covers the active area 110a of the first substrate 110 and thus exposes the first pads 150R, 150G, and 150B located at the peripheral area 110e, which should however not be construed as limitations to the invention. In the embodiment of FIG. 1, the first pad 150R and the first pad 150B are located at a left side of the peripheral area 110e, and the first pad 150G is located at a right side of the peripheral area 110e. Nevertheless, the invention should not be construed as limited thereto. In other embodiments, the first pad 150R, the first pad 150B, and the first pad 150G may be disposed in other suitable manners.

At least one of the test lines (e.g., the test line 140R and the test line 140G) is grounded through at least one of the first pads (e.g., the first pad 150R and the first pad 150G). For instance, in this embodiment, the display panel 100 further includes the second pad 196 and the second pad 198 disposed at the peripheral area 110e and respectively located beside the first pad 150R and the first pad 150G, wherein the second pad 196 and the second pad 198 are grounded. After manufacturing of the display panel 100 is completed (meaning that when the pixel structures 120R and 120G are not required to be detected through the first pad 150R and the first pad 150G), a conductive glue AGR (e.g., silver glue) may be used to electrically connect the first pad 150R and the second pad 196, such that the test line 140R electrically connected to the first pad 150R can be grounded. Similarly, a conductive glue AGG may also be used to electrically connect the first pad 150G and the second pad 198, such that the test line 140G electrically connected to the first pad 150G can be grounded. The grounded test lines 140R and 140G are able to provide an electrostatic protection function, and that components (e.g., the pixel structures 120R, 120G, and 120B, the second driving unit 184, etc.) of the display panel 100 are less likely to be damaged by static electricity. That is to say, the test lines 140R and 140G can transmit the data signals configured for detection in the process of manufacturing and detecting the display panel 100; moreover, at least one of the test lines 140R and 140G can also act as an electrostatic protection line after manufacturing of the display panel 100 is completed. As such, test lines and additional electrostatic protection lines do not have to be disposed simultaneously in the display panel 100 in this embodiment, and a layout space is thereby saved. In the embodiment of FIG. 1, the corresponding first pad 150R and the second pad 196 (and/or the corresponding first pad 150G and the second pad 198) are adjacent to each other and may be arranged in the direction x. Nevertheless, the invention should not be construed as limited thereto. In other embodiments, the corresponding first pad 150R and the second pad 196 (and/or the corresponding first pad 150G and the second pad 198) may also be disposed in other suitable manners. For instance, in other embodiments, the corresponding first pad 150R and the second pad 196 (and/or the corresponding first pad 150G and the second pad 198) may be arranged in the direction y.

The second substrate 160 has an inner surface 160a facing the display medium 170, an outer surface 160b opposing the display medium 170, and a side surface 160c connected between the inner surface 160a and the outer surface 160b. The display panel 100 may further include a conductive pattern 190 disposed at the outer surface 160a of the second substrate 160. For instance, the conductive pattern 190 may be a transparent shielding electrode in this embodiment, and the transparent shielding electrode can reduce an interference level caused by external signals to the internal signals of the display panel 100. Nevertheless, the invention should not be construed as limited thereto. In other embodiments, the conductive pattern 190 may also serve as a portion of a touch sensing structure. In this embodiment, the conductive pattern 190 is, for example, a transparent conductive layer. A material of the transparent conductive layer includes metal oxide, such as indium tin oxide, indium zinc oxide, aluminum tin oxide, aluminum zinc oxide, indium germanium zinc oxide, other suitable oxides, or a stack layer including at least two of the above, which should however not be construed as limitations to the invention.

In this embodiment, the conductive glue AGR may cover a portion of the conductive pattern 190 located near an edge of the second substrate 160 and the second pad 196, such that the conductive pattern 190 is grounded and is able to provide a shielding effect. To be more specifically, the conductive glue AGR may simultaneously cover the portion of the conductive pattern 190 near the edge of the second substrate 160, the second pad 196, and the first pad 150R in this embodiment. The first pad 150R may be electrically connected to the conductive pattern 190 through the conductive glue AGR. That is to say, when the conductive glue AGR is used to electrically connect the conductive pattern 190 and the second pad 196 such that the conductive pattern 190 is grounded, the conductive glue AGR may be used to electrically connect the first pad 150R and the second pad 196, simultaneously. As such, additional numbers of gel-applying are no longer required to enable the test line 140R to be grounded. The display panel 100 can deliver electrostatic protection and save layout space without bring increased complexity to the processing.

Similarly, the conductive glue AGG may cover the portion of the conductive pattern 190 located near the edge of the second substrate 160 and the second pad 198 in this embodiment, such that the conductive pattern 190 is grounded and is able to provide the shielding effect. To be more specific, the conductive glue AGG may simultaneously cover the portion of the conductive pattern 190 near the edge of the second substrate 160, the second pad 198, and the first pad 150G. The first pad 150G may be electrically connected to the conductive pattern 190 through the conductive glue AGG. That is to say, when the conductive glue AGG is used to electrically connect the conductive pattern 190 and the second pad 198 such that the conductive pattern 190 is grounded, the conductive glue AGG may be used to electrically connect the first pad 150G and the second pad 198, simultaneously. As such, additional numbers of gel-applying are no longer required to enable the test line 140G to be grounded. As shown in FIG. 2, the first pad 150R may be close to the light-shielding pattern 121 in this embodiment to facilitate the conductive glue AGG to be in contact simultaneously with the conductive pattern 190 and the first pad 150R. In this embodiment, an edge e2 of the first pad 150R may just overlap an edge e1 of the light-shielding pattern 121, which should however not be construed as limitations to the invention. In other embodiments, the edge e2 of the first pad 150R may just be separated from the edge e1 of the light-shielding pattern 121 by a suitable distance.

For instance, in this embodiment, a side length D1 of the first pad 150R is, for example, 800 μm, and the first pad 150R may be a square of 800 μm×800 μm. A distance D2 between the sealant 194 and the edge of the second substrate 160 is, for example, 0.3 mm, and a width D3 of the sealant 194 is, for example, 0.5 mm, which should however not be construed as limitations to the invention.

Figure 3:
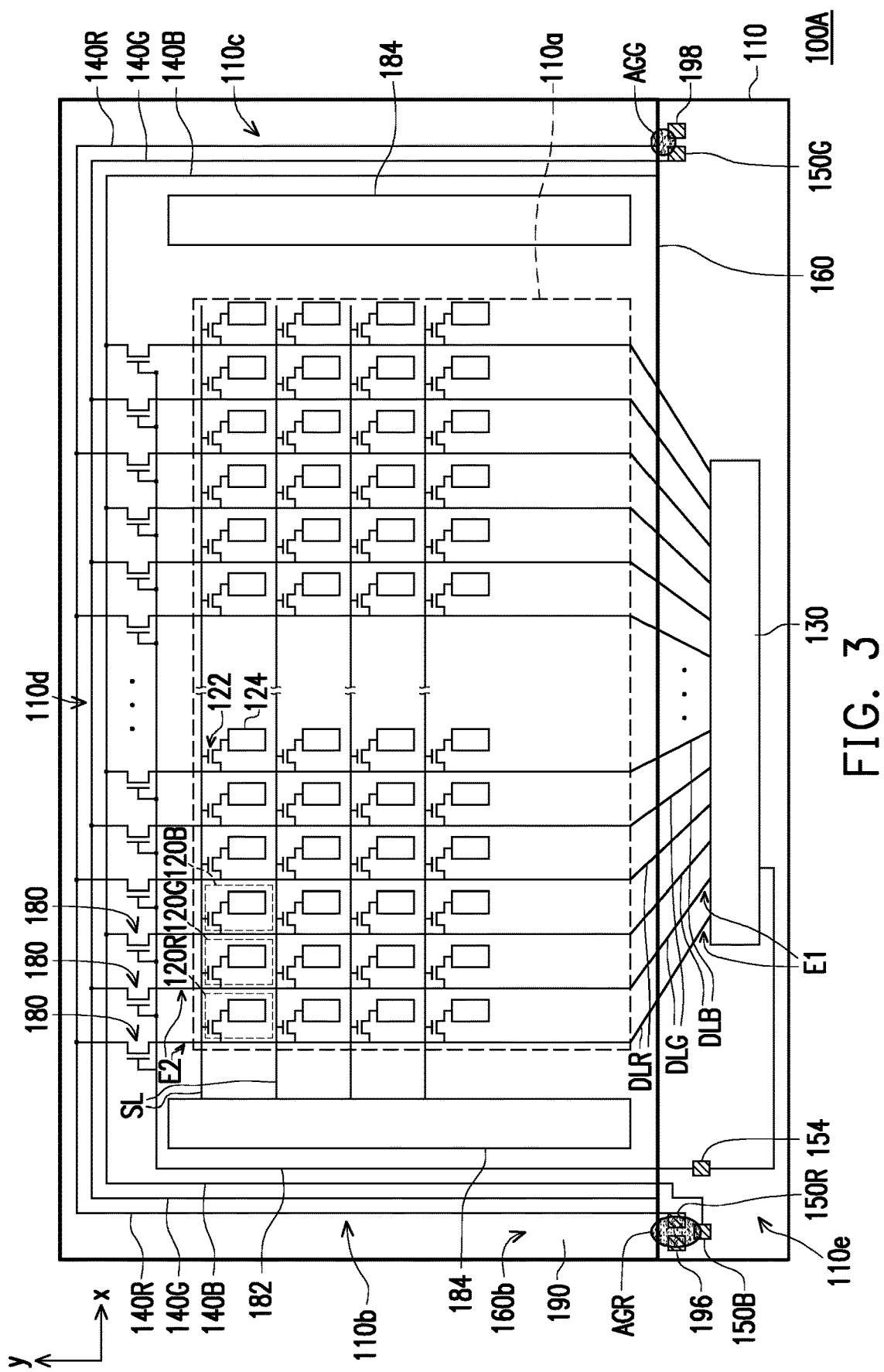
FIG. 3 is a schematic top view of a display panel according to another embodiment of the invention.

FIG. 3 is a schematic top view of a display panel according to another embodiment of the invention. A display panel 100A of FIG. 3 is similar to the display panel 100 of FIG. 1. A difference between the display panel 100A of FIG. 3 and the display panel 100 of FIG. 1 is as follows. In the display panel 100 of FIG. 1, the first pads 150R and 150G electrically connected to the test lines 140R and 140G are electrically connected to the grounded second pads 196 and 152G by using the conductive glue AGR and the conductive glue AGG. The first pad 150B electrically connected to the test line 140B is disposed relatively far away from the second pad 196, and the first pad 150B is not electrically connected to the grounded second pad 196 by using the conductive glue AGR. Nevertheless, in the display panel 100A of FIG. 3, the first pad 150B electrically connected to the test line 140B may be disposed beside the second pad 196, and the first pad 150B and the first pad 150R may be electrically connected to the second pad 196 by using the same conductive glue AGR. The display panel 100A of FIG. 3 achieves effects and has advantages similar to those of the display panel 100 of FIG. 1, and thus will not be repeated hereinafter.

In view of the foregoing, the display panel provided by an embodiment of the invention includes the first substrate, the second substrate opposite to the first substrate, and the display medium located between the first substrate and the second substrate. The display panel further includes the pixel structures located at the active area of the first substrate, the data lines and the scan lines electrically connected to the pixel structures, the first driving unit located at the peripheral area of the first substrate, the at least one test line, and the at least one first pad located at the peripheral area. Each of the data lines has a first end and a second end opposite to each other. The first driving unit is electrically connected to the first ends of the data lines. The at least one test line is electrically connected to the second ends of at least part of the data lines. The at least one test line is grounded through the at least one first pad. The grounded at least one test line provides the electrostatic protection function, and thus the components (e.g., the pixel structures etc.) of the display panel are less likely to be damaged by static electricity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display panel, comprising:
   a first substrate, having an active area and a peripheral area outside the active area;
   a plurality of pixel structures, located at the active area;
   a plurality of data lines and a plurality of scan lines, located at the active area and electrically connected to the pixel structures, wherein the data lines and the scan lines intersect each other, and each of the data lines has a first end and a second end opposite to each other;
   a first driving unit, located at the peripheral area and electrically connected to first ends of the data lines;
   at least one test line, located at the peripheral area and electrically connected to second ends of at least part of the data lines;
   at least one first pad, located on the first substrate and electrically connected to the at least one test line, wherein the at least one test line is grounded through the at least one first pad;
   a plurality of test switches, located at the peripheral area and electrically connected between the at least one test line and the second ends of the at least part of the data lines;
   a second substrate, disposed opposite to the first substrate; and
   a display medium, located between the first substrate and the second substrate.
2. The display panel as claimed in claim 1, wherein the test switches and the first driving unit are located at opposite sides of the active area.
3. A display panel, comprising:
   a first substrate, having an active area and a peripheral area outside the active area;
   a plurality of pixel structures, located at the active area;
   a plurality of data lines and a plurality of scan lines, located at the active area and electrically connected to the pixel structures, wherein the data lines and the scan lines intersect each other, and each of the data lines has a first end and a second end opposite to each other;
   a first driving unit, located at the peripheral area and electrically connected to first ends of the data lines;
   at least one test line, located at the peripheral area and electrically connected to second ends of at least part of the data lines;

at least one first pad, located on the first substrate and electrically connected to the at least one test line, wherein the at least one test line is grounded through the at least one first pad;

a second substrate, disposed opposite to the first substrate; and a display medium, located between the first substrate and the second substrate;

wherein the second substrate covers the active area of the first substrate and exposes the at least one first pad.

4. A display panel, comprising:

a first substrate, having an active area and a peripheral area outside the active area;

a plurality of pixel structures, located at the active area;

a plurality of data lines and a plurality of scan lines, located at the active area and electrically connected to the pixel structures, wherein the data lines and the scan lines intersect each other, and each of the data lines has a first end and a second end opposite to each other;

a first driving unit, located at the peripheral area and electrically connected to first ends of the data lines;

at least one test line, located at the peripheral area and electrically connected to second ends of at least part of the data lines;

at least one first pad, located on the first substrate and electrically connected to the at least one test line, wherein the at least one test line is grounded through the at least one first pad;

a second substrate, disposed opposite to the first substrate;

a display medium, located between the first substrate and the second substrate; and a conductive pattern, located at an outer surface of the second substrate opposing the display medium, wherein the at least one first pad is electrically connected to the conductive pattern.

5. The display panel as claimed in claim 4, wherein the display panel further comprises:

a conductive glue, covering a portion of the conductive pattern, wherein the at least one first pad is electrically connected to the conductive pattern through the conductive glue.

6. The display panel as claimed in claim 5, wherein the conductive glue covers a portion of the conductive pattern and the at least one first pad.

7. The display panel as claimed in claim 5, wherein the display panel further comprises:

at least one second pad, located beside the first pad, wherein the conductive glue covers the portion of the conductive pattern, the at least one first pad, and the at least one second pad.

8. The display panel as claimed in claim 7, wherein the pixel structures comprise a plurality of first pixel structures configured to display a first color and a plurality of second pixel structures configured to display a second color, the data lines comprise a plurality of first data lines electrically connected to the first pixel structures and a plurality of second data lines electrically connected to the second pixel structures, the at least one test line comprises a first test line electrically connected to the second ends of the first data lines and a second test line electrically connected to the second ends of the second data lines, the at least one first pad comprises a plurality of first pads electrically connected to the first test line and the second test line respectively, and the conductive glue covers the portion of the conductive pattern, the at least one first pad and the at least one second pad.

9. The display panel as claimed in claim 4, wherein the conductive pattern is a transparent shield layer or a portion of a touch sensing structure.

* * * * *